(12) United States Patent
Tovar et al.

(10) Patent No.: US 8,033,006 B2
(45) Date of Patent: Oct. 11, 2011

(54) METHOD FOR MOUNTING A THREAD-PROTECTING ELEMENT INTO A RECEIVING THREAD AND MOUNTING SPINDLE AND A THREAD-PROTECTING ELEMENT THEREFORE

(75) Inventors: Francisco Tovar, Bielefeld (DE); Klaus-Friedrich Grubert, Bückeburg (DE)

(73) Assignee: Bofag Fasteners AG (CH)

( * ) Notice: Subject to any disclaimer, the term of this patent is extended or adjusted under 35 U.S.C. 154(b) by 1010 days.

(21) Appl. No.: 11/847,992

(22) Filed: Aug. 30, 2007

(65) Prior Publication Data
US 2008/0092357 A1     Apr. 24, 2008

(30) Foreign Application Priority Data
Sep. 6, 2006   (EP) .................................. 06018645

(51) Int. Cl.
*B23P 11/00*     (2006.01)
(52) U.S. Cl. .................................................. 29/525.01
(58) Field of Classification Search ............... 29/525.01, 29/525.02, 428, 240.5, 240; 411/438, 387.4; 403/265; 408/14
See application file for complete search history.

(56) References Cited

U.S. PATENT DOCUMENTS

| | | | |
|---|---|---|---|
| 2,152,681 A | 4/1939 | Caminez | |
| 2,363,663 A | 11/1944 | Findley | |
| 2,594,900 A | 4/1952 | Forster | |
| 4,115,017 A * | 9/1978 | Wilhelmsson | 408/14 |
| 4,553,303 A | 11/1985 | Yamamoto | |
| 4,563,119 A | 1/1986 | Cosenza | |
| 4,645,398 A | 2/1987 | Cosenza et al. | |
| 2005/0095083 A1 | 5/2005 | Masuda | |

FOREIGN PATENT DOCUMENTS
FR     2 715 341 A    1/1994
* cited by examiner

*Primary Examiner* — John C Hong
(74) *Attorney, Agent, or Firm* — Seyfarth Shaw LLP

(57) ABSTRACT

A mounting spindle with a thread that is formed adapted to the thread-protecting element, formed as a helical wire, serves as a mounting tool with the mounting method. The helical wire is fixed on the mounting spindle by frictional engagement, which is greater than the torque necessary for mounting the helical wire into the receiving threads. The mounting spindle with the helical wire fixed thereon is then threaded into the receiving threads. Then, the mounting spindle is removed from the helical wire by rotation opposite to the mounting direction. The frictional force is achieved by a reduced-diameter end section of the helical wire.

6 Claims, 2 Drawing Sheets

US 8,033,006 B2

METHOD FOR MOUNTING A THREAD-PROTECTING ELEMENT INTO A RECEIVING THREAD AND MOUNTING SPINDLE AND A THREAD-PROTECTING ELEMENT THEREFORE

FIELD OF THE INVENTION

The present invention relates to a method for mounting a thread-protecting element in a receiving thread of structural member, as well as, a mounting spindle and a thread-protecting element therefore.

BACKGROUND OF THE INVENTION

Conventional thread-protecting elements in the form of a helical-shaped, wound wire serve for strengthening the receiving threads of structural members composed of materials of relatively low strength. For this purpose, the thread-protecting element is mounted in the receiving threads, whereupon the screw can then be rotated into the thread-protecting element.

For threading the thread-protecting element into the receiving threads, two types of assembly are customary. With the one type of assembly, the helical-shaped wire is provided with a notch for pulling, using which a special tool pulls the helical-shaped wire along and rotates into the receiving thread, see, for example, U.S. Pat. No. 4,563,119, U.S. Pat. No. 4,645,398, U.S. Pat. No. 4,553,303, etc. With the other type of assembly, the helical-shaped wire is provided on one end with a diagonally running pin for pulling, using which, in turn, a special stool pulls the helical-shaped wire along and through this, rotates it into the receiving thread, see, for example, U.S. Pat. No. 2,152,681, U.S. Pat. No. 2,363,663, etc. The notch for pulling results in a modification of the cross section of the wire, which makes the winding process more difficult. The pin for pulling has the disadvantage that, after the assembly, it must be broken and removed. In each case, an elaborate and costly special tool is required for mounting the helical-shaped wire into the receiving thread.

SUMMARY OF THE INVENTION

The objective of the present invention is to specify a method for mounting a thread-protecting element in the form of a helical wire into a receiving thread of a structural member, where said method enables the use of an extremely simple mounting tool as well as a helical wire that can be manufactured cost-effectively, and that can be performed in a simple way. Further, a mounting spindle and a helical wire for performing the method are to be developed.

With the method according to the invention, a mounting tool in the form of a mounting spindle with a thread, which is adapted to the geometry of the helical wire, is used. The helical wire is fixed on the mounting tool by frictional engagement, which is greater than the torque necessary for mounting the helical wire into the receiving threads. The mounting spindle with the helical wire fixed thereon is then threaded into the receiving threads of the structural member. Then, the mounting spindle is rotated opposite to said mounting direction in order to remove the mounting spindle from the helical wire.

The frictional engagement is preferably created in that the helical wire has at least one end section whose internal diameter is reduced so far in comparison to the remaining section of the helical wire that it is smaller than the diameter of the mounting spindle. Through this, a type of wrap spring effect results, which enables a trouble-free mounting of the helical wire, and a trouble-free removal of the mounting spindle. In principle, it is also conceivable to provide the helical wire with two reduced diameter end sections, such that the helical wire can then be used "bi-directionally".

With the method according to the invention, an extremely simple mounting tool is used, which is solely composed of a thread body, and which requires no complicated pulling features whatsoever such as the special tools of the state of the art. The helical wire used with the method according to the invention permits an especially simple production, because no molding of a pin for pulling or no punching of notches for pulling is required. The notches for pulling provided in the state of the art not only weaken the helical wire, but also complicate the winding process. Further, no pin breakage and pin removal is necessary, which simplifies the mounting and is especially advantageous in the thread repair and in series production. Thus, for thread repair, a cost-effective thread-protecting element without pins is available.

Advantageous further developments and embodiments of the invention are defined in the dependent claims.

BRIEF DESCRIPTION OF THE DRAWINGS

The invention is explained in an exemplary embodiment using the figures. In the figures.

DETAILED DESCRIPTION OF A PREFERRED EMBODIMENT OF THE INVENTION

Figure 1:
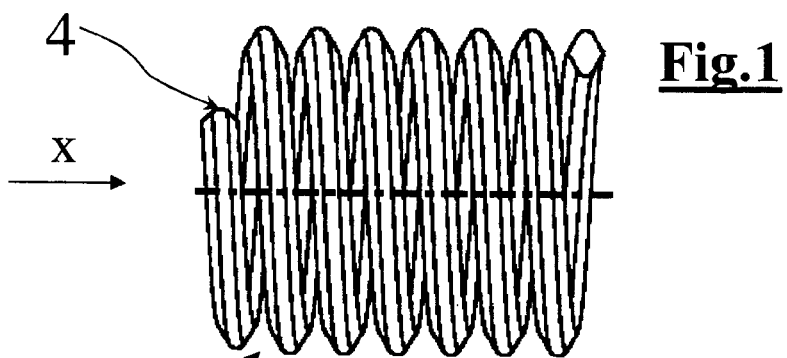
FIG. 1 shows a side view of a thread-protecting element in the form of a helical wire.

FIG. 1 shows a thread-protecting element in the form of a helical wire 2, which is designed as a helical spring. In the represented exemplary embodiment, the helical wire 2 has a diamond-shaped cross-section; however, arbitrarily differing cross-sectional shapes are also possible. The helical wire 2 is composed of a spring steel or an other elastic material of high strength.

Figure 2:
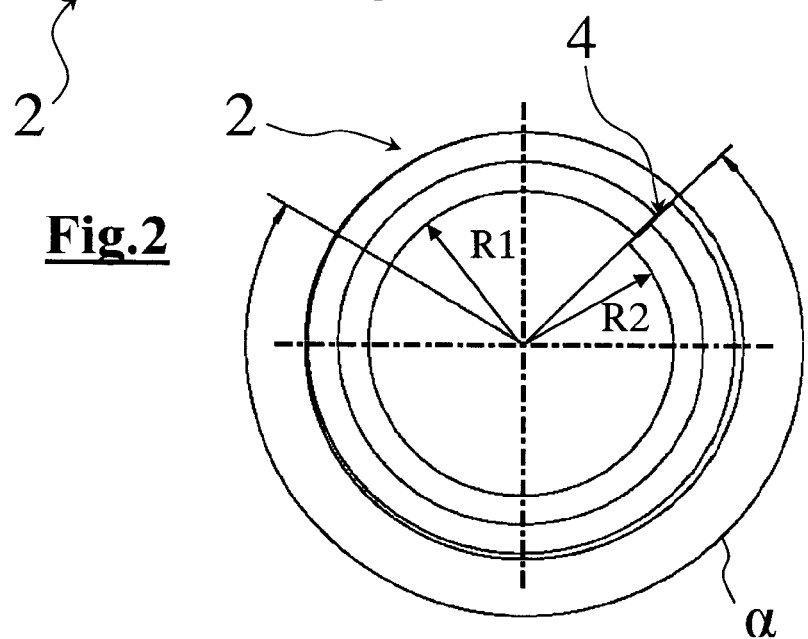
FIG. 2 shows an end view of the helical wire in FIG. 1 as seen in the direction of the arrow X.

The helical wire 2 has an end section 4, whose internal diameter is reduced compared to the diameter of the remaining section of the helical wire. As represented in FIG. 2, the end section 4 runs continuously from a radius R1 into a radius R2, wherein the radius R2 is the internal radius at the end of the end section 4, and the radius R1 is the internal radius of the remaining section of the helical wire 2. The reduction of the diameter of the end section 4 can be formed by a spiral or by sequential circular arcs of various radii, and extending in the circumferential direction over an angle $\alpha$. The angle $\alpha$ preferably lies between 360° and 720°, but can, however, also be selected to be greater or smaller. According to a preferred embodiment, the end section 4 is formed from a single winding, such that the angle $\alpha$ is on the order of 360°.

Figure 3:
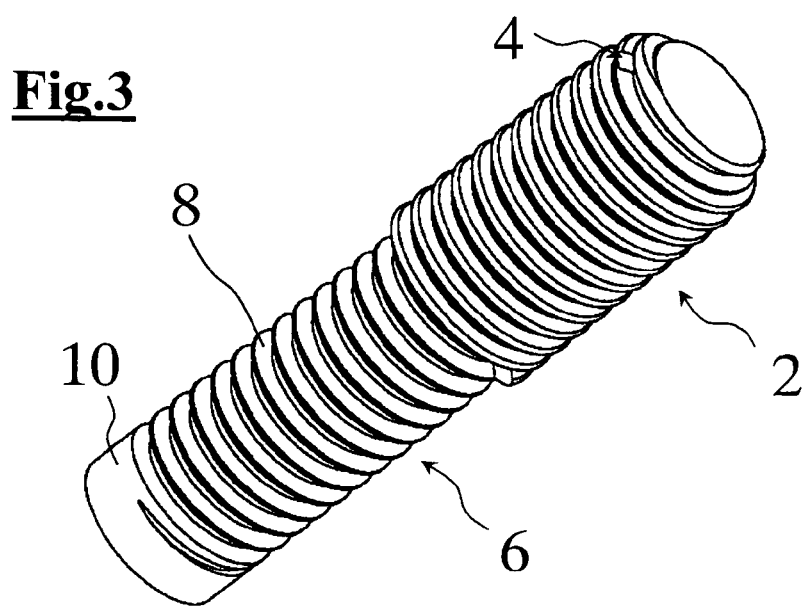
FIG. 3 shows a perspective view of a mounting spindle with a helical wire fixed thereon.
Figure 4:
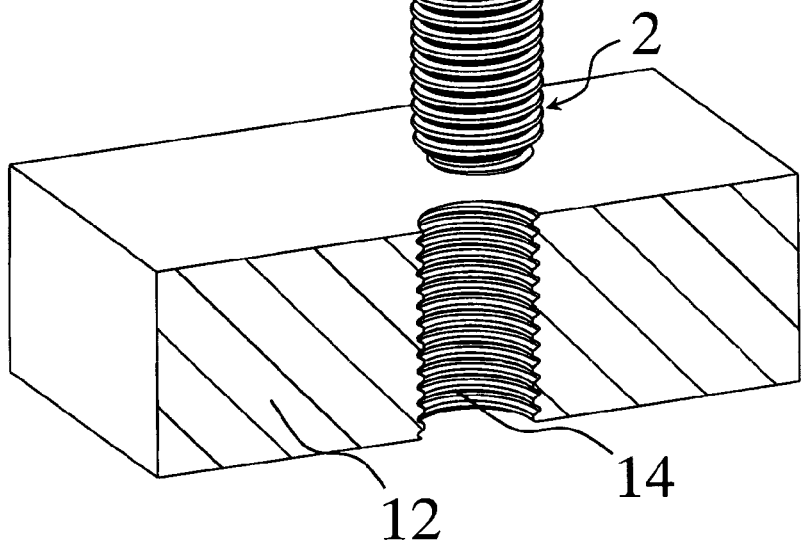
FIG. 4 shows a schematic representation of a mounting spindle with a helical wire fixed thereon before the mounting into the receiving thread of a structural member.

The mounting tool, in the form of a mounting spindle 6, represented in FIG. 3, serves for mounting the helical wire 2 into a receiving thread of a structural member 12 (FIG. 4, 5). The mounting spindle 6 is composed of a threaded body 8 with an exterior thread and a drive feature 10. The drive feature 10 is, in the represented exemplary embodiment, a straight shank, such as can be used for chuck (not shown). However, arbitrarily different drive features are also possible, for example, a square or hexagonal shaft for use as a hand tool, a standardized multi-cornered shaft for machine assembly tools for screws, etc.

The thread of the mounting spindle 6 is dimensioned such that the diameter of the mounting spindle is greater than the interior diameter of the end section 4 of the helical wire 2. The difference in the diameters between the helical wire 2 and the mounting spindle 6 is selected such that the helical wire 2 is fixed on the mounting tool 8 by a frictional engagement, which is greater that the torque that is necessary for screwing the helical wire 2 into the receiving threads. Thus, there arises a type of wrap spring effect, which permits an extremely simple mounting of the helical wire into the receiving threads, which is now explained in more detail.

The tread of the mounting spindle 6 in the represented exemplary embodiment has a constant diameter over its length. It is also conceivable to somewhat enlarge the diameter of the mounting spindle in the section of the reduced diameter end section 4 of the helical wire 2, such that the frictional engagement and therefore the wrap spring effect is achieved through a combination of a diameter reduction of the helical wire and a diameter enlargement of the mounting spindle.

For the mounting procedure, first, the mounting spindle 6 is screwed into the helical wire 2 from the end lying opposite from the end section 4. This can occur manually or by means of a simple assembly tool (not shown). When the mounting tool 6 is screwed into the helical wire so far that the reduced diameter end section 4 sits on the mounting spindle 6, the mentioned wrap spring effect becomes effective. The mounting spindle 6 can be formed such that the wrap spring effect is effective at the thread flanks and/or the thread tips of the mounting spindle 6 and the helical wire 2.

Figure 5:
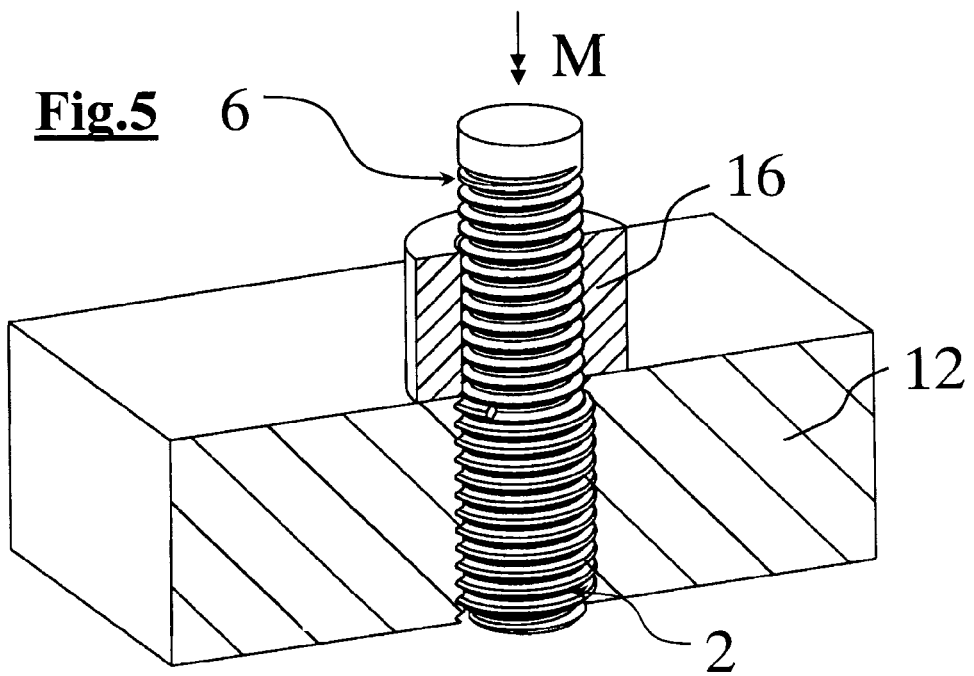
FIG. 5 shows a view corresponding to FIG. 4, after the mounting of the helical wire in the receiving thread.

The mounting spindle 6 with the helical wire 2 fixed frictionally engaged thereon, is screwed into the receiving thread 14 of the structural member 2 by a simple rotation procedure with the necessary torque, as is indicated in FIGS. 4 and 5 by the arrows M.

In order to enable this, the receiving thread 14 is formed adapted to the geometry of the helical wire 2. In the unmounted state, the helical wire 2 has an outer diameter which is greater than the interior diameter of the receiving thread 14, in order to ensure a tight fit of the helical wire 2 in the receiving thread 14. Thus, the helical wire 2 encircles—before the mounting—the mounting spindle 6 with play, except the diameter reduced end section 4, which ensures the necessary frictional engagement between the mounting tool 6 and the helical wire 2.

The mounting depth of the helical wire 2 in the receiving thread 14 can be visually monitored. In the represented exemplary embodiment, the mounting spindle 2 is equipped with a depth abutment 16, which is adjustably supported on the mounting spindle 6 by means of an interior thread, and can be fixed by a countering (not shown) in the respectively desired position on the mounting spindle 14. Therefore, the depth abutment 16 enables the compliance with a desired mounting depth, which can be used, for example, in a series production assembly for the purpose of ensuring a constant mounting depth for all helical wires.

When the mounting tool 6 with the helical wire 2 fixed thereon has attained the desired mounting depth, the direction of rotation of the mounting spindle 6 is reversed. Through this, the wrap spring effect between the mounting spindle 6 and the diameter-reduced end section 4 of the helical wire 2 is cancelled. Thus, the mounting spindle is taken out while the helical wire 2 remains in the receiving thread 14 of the structural member 12.

Advantageously, the diameter of the mounting spindle 6 is selected somewhat greater than that of a standard screw (e.g., ISO standard) with essentially the same dimensions, in fact, greater by so much that the mounting spindle can be barely screwed into the associated standardized receiving thread. The thread body 8 of the mounting spindle 6 then has a somewhat greater diameter than the standardized screw (not shown). Therefore, the reduced diameter end section 4 of the helical wire 2 can be at a size such that the standardized screw can be screwed into the mounted helical wire.

It is pointed out, that the helical wire can be provided in a known way with a screw-clamping section in the form of one or more polygon shaped windings, which after the mounting of the screw in the helical wire serve as securing against screw loosening.

We claim:

1. A method for mounting a thread protecting element comprising a helical wire into receiving threads of a structural member, which method comprises the following steps:
 a) providing a helical wire having a geometry adapted to the receiving threads of the structural member,
 b) providing a mounting spindle having threads which are matingly shaped with respect to the geometry of the helical wire,
 c) fixing the helical wire on the mounting spindle by frictional engagement resisting a torque required for mounting the helical wire into the receiving threads,
 d) threading the mounting spindle including the helical wire fixed thereon into said receiving threads by rotation of the mounting spindle in a mounting direction,
 e) removing the mounting spindle from the helical wire by rotating the mounting spindle opposite to said mounting direction, wherein
 the helical wire having at least an end section of an internal diameter which is reduced as to that of any remaining section of the helical wire such that the reduced diameter is smaller than the diameter of the mounting spindle in order to provide said frictional engagement required for mounting the helical wire in the receiving threads, and
 the mounting spindle being of a diameter slightly exceeding that of a standard screw of substantially similar dimensions which is to be inserted into the helical wire, and said end section of the helical wire being of an internal diameter great enough to enable said standard screw to be threaded into the helical wire after having been mounted in said receiving threads.

2. The method of claim 1 wherein said end section of the helical wire extends through an angle from 360° to 720°.

3. The method of claim 1 wherein said frictional engagement between the mounting spindle and the helical wire is effective at flanks or/and tips of the threads of the mounting spindle and the helical wire.

4. The method of claim 1 wherein, before being mounted in the receiving threads, the helical wire is of an outer diameter which exceeds an internal diameter of the receiving threads of the structural member in order to ensure retention of the helical wire within the receiving threads.

5. The method of claim 1 wherein the mounting spindle is provided with a drive feature.

6. The method of claim 1 wherein the mounting spindle is provided with an adjustable depth abutment allowing to adjust the depth at which the helical wire is mounted within the receiving threads.

\* \* \* \* \*